(12) United States Patent
Summerland

(10) Patent No.: US 9,736,894 B2
(45) Date of Patent: Aug. 15, 2017

(54) IMPROVEMENTS RELATING TO POWER ADAPTORS

(71) Applicant: Verdi Vision Limited, Stockport (GB)

(72) Inventor: David Summerland, Stockport (GB)

(73) Assignee: VERDI VISION LIMITED (GB)

( * ) Notice: Subject to any disclaimer, the term of this patent is extended or adjusted under 35 U.S.C. 154(b) by 0 days.

(21) Appl. No.: 15/103,705

(22) PCT Filed: Dec. 12, 2014

(86) PCT No.: PCT/GB2014/053695
§ 371 (c)(1),
(2) Date: Jun. 10, 2016

(87) PCT Pub. No.: WO2015/087089
PCT Pub. Date: Jun. 18, 2015

(65) Prior Publication Data
US 2016/0309557 A1    Oct. 20, 2016

(30) Foreign Application Priority Data
Dec. 12, 2013    (GB) .................................. 1322022.3

(51) Int. Cl.
H05B 33/08    (2006.01)
H02M 7/217    (2006.01)

(52) U.S. Cl.
CPC ........ *H05B 33/0818* (2013.01); *H02M 7/217* (2013.01); *H05B 33/0815* (2013.01); *H05B 33/0821* (2013.01); *H05B 33/0845* (2013.01)

(58) Field of Classification Search
CPC ............ H05B 33/0818; H05B 33/0815; H05B 33/330821; H05B 33/0845
(Continued)

(56) References Cited

U.S. PATENT DOCUMENTS 4,277,728 A    7/1981    Stevens
4,415,839 A    11/1983    Lesea
(Continued)

FOREIGN PATENT DOCUMENTS

DE    100 11 077 A1    9/2001
DE    20 2004 002305 U1    4/2004
(Continued)

OTHER PUBLICATIONS

56W Off-line, 120 VAC with PFC, 160V, 350mA Load, Dimmer Switch Compatible LED Drive. Internet Citation Feb. 1, 2009; pp. 1-19 XP 009150405 Retrieved from the Internet UR: http:/www.supertex.com/pdf/app_notes/DH-H05.pdf.
(Continued)

*Primary Examiner* — Dylan White
(74) *Attorney, Agent, or Firm* — Schmeiser, Olsen & Watts, LLP

(57) ABSTRACT

A power adaptor including an input for connection to an AC power supply, an output for connection to a load, and a resonant circuit coupled to the input that provides power to the output suitable for driving the load, is provided. The resonant circuit has two or more resonant frequencies, which are not harmonics of each other. The power adaptor includes a controller adapted to drive the resonant circuit at, or near, each of the two or more resonant frequencies to select different characteristics of the current drawn from the AC power supply, in use.

24 Claims, 6 Drawing Sheets

(58) Field of Classification Search
USPC .......................................................... 315/224
See application file for complete search history.

(56) References Cited

U.S. PATENT DOCUMENTS

| | | | |
|---|---|---|---|
| 4,443,842 A | 4/1984 | Jessee | |
| 4,544,863 A * | 10/1985 | Hashimoto | H05B 41/2825 |
| | | | 315/209 R |
| 5,121,287 A | 6/1992 | Lee | |
| 5,381,076 A | 1/1995 | Nerone | |
| 5,426,350 A | 6/1995 | Lai | |
| 5,430,356 A | 7/1995 | Ference et al. | |
| 5,463,286 A | 10/1995 | D/Aleo et al. | |
| 2,661,645 A | 8/1997 | Hochstein | |
| 5,661,645 A | 8/1997 | Hochstein | |
| 5,783,909 A | 7/1998 | Hochstein | |
| 5,914,572 A * | 6/1999 | Qian | H05B 41/28 |
| | | | 315/209 R |
| 6,011,362 A | 1/2000 | Moisin | |
| 6,028,776 A | 2/2000 | Ji et al. | |
| 6,078,147 A | 6/2000 | Arts et al. | |
| 6,093,983 A | 7/2000 | Singh | |
| 6,097,614 A | 8/2000 | Jain et al. | |
| 6,118,231 A | 9/2000 | Geiginer et al. | |
| 6,181,082 B1 | 1/2001 | Moisin | |
| 6,181,588 B1 | 1/2001 | Kates et al. | |
| 6,188,163 B1 | 2/2001 | Danov | |
| 6,300,727 B1 | 10/2001 | Bryde et al. | |
| 6,353,545 B1 | 3/2002 | Ueda | |
| 6,411,045 B1 | 6/2002 | Nerone | |
| 6,545,434 B2 | 4/2003 | Sembhi et al. | |
| 6,590,350 B1 | 7/2003 | Tyson | |
| 6,600,273 B2 | 7/2003 | Kim et al. | |
| 6,842,668 B2 | 1/2005 | Carson et al. | |
| 6,927,546 B2 | 8/2005 | Adamson et al. | |
| 6,933,686 B1 | 8/2005 | Bishel | |
| 6,954,038 B2 | 10/2005 | Ido et al. | |
| 7,038,399 B2 | 5/2006 | Lys et al. | |
| 7,110,269 B2 | 9/2006 | Cao et al. | |
| 7,119,494 B2 | 10/2006 | Hui et al. | |
| 7,312,695 B2 | 12/2007 | Lehmer et al. | |
| 7,339,287 B2 | 3/2008 | Jepsen et al. | |
| 7,646,029 B2 | 1/2010 | Mueller et al. | |
| 7,786,676 B2 | 8/2010 | Cheng et al. | |
| 8,242,711 B2 | 8/2012 | Summerland et al. | |
| 2001/0022501 A1 | 9/2001 | Pilz et al. | |
| 2002/0191426 A1 | 12/2002 | Hussein et al. | |
| 2004/0085030 A1 | 5/2004 | LaFlamme | |
| 2004/0228153 A1 * | 11/2004 | Cao | H02M 3/3376 |
| | | | 363/71 |
| 2004/0264187 A1 | 12/2004 | Vanderschuit | |
| 2005/0231133 A1 | 10/2005 | Lys | |
| 2006/0002110 A1 | 1/2006 | Dowling et al. | |
| 2006/0022214 A1 | 2/2006 | Morgan et al. | |
| 2006/0192502 A1 | 8/2006 | Brown et al. | |
| 2006/0238136 A1 | 10/2006 | Johnson, III et al. | |
| 2007/0108916 A1 | 5/2007 | Wang et al. | |
| 2007/0145907 A1 | 6/2007 | Hwang | |
| 2007/0152604 A1 | 7/2007 | Tatsumi | |
| 2007/0182347 A1 | 8/2007 | Shteynberg et al. | |
| 2007/0236159 A1 | 10/2007 | Beland | |
| 2008/0143271 A1 | 6/2008 | Takahashi et al. | |
| 2008/0224629 A1 | 9/2008 | Melanson | |
| 2009/0066262 A1 | 3/2009 | Tateishi | |
| 2009/0322300 A1 * | 12/2009 | Melanson | H02M 3/1563 |
| | | | 323/284 |
| 2013/0119888 A1 | 5/2013 | Elferich et al. | |

FOREIGN PATENT DOCUMENTS

| | | | |
|---|---|---|---|
| EP | 0567280 A2 | 10/1993 | |
| EP | 0574993 A1 | 12/1993 | |
| EP | 0889673 A2 | 1/1999 | |
| EP | 1093212 A1 | 4/2001 | |
| EP | 1250030 A2 | 10/2002 | |
| EP | 1528785 A1 | 5/2005 | |
| EP | 1564618 A1 | 8/2005 | |
| EP | 2079278 A2 | 7/2009 | |
| EP | 2257124 A1 | 12/2010 | |
| GB | 2 128 043 A | 4/1984 | |
| GB | 2184566 A | 6/1987 | |
| GB | WO 2010041067 A1 * | 4/2010 | ............ H02M 7/538 |
| JP | S6194568 A | 5/1986 | |
| JP | 03233895 | 10/1991 | |
| JP | H08265124 A | 10/1996 | |
| JP | 03 265464 A | 11/1998 | |
| JP | 3196157 A | 4/1999 | |
| JP | 11231838 A | 8/1999 | |
| JP | 2001-313424 | 9/2001 | |
| JP | 2002137659 A | 5/2002 | |
| JP | 2002272127 A | 9/2002 | |
| JP | 2003-157986 | 5/2003 | |
| JP | 2003-317989 | 11/2003 | |
| JP | 2004273267 A | 9/2004 | |
| JP | 2005-011739 | 1/2005 | |
| JP | 2007-80771 A | 3/2007 | |
| JP | 2007035403 A | 3/2007 | |
| JP | 2007227155 A | 9/2007 | |
| JP | 09 163757 A | 7/2009 | |
| KR | 10-2006-0115874 A | 11/2006 | |
| WO | WO9914990 A1 | 3/1999 | |
| WO | 99/45750 A1 | 9/1999 | |
| WO | 01/82657 A1 | 11/2001 | |
| WO | 02/062106 A1 | 8/2002 | |
| WO | 02/091805 A1 | 11/2002 | |
| WO | 03/079738 A1 | 9/2003 | |
| WO | 03/096761 A1 | 11/2003 | |
| WO | 2005/115058 A1 | 2/2005 | |
| WO | 2005/048658 | 5/2005 | |
| WO | 2005/048658 A1 | 5/2005 | |
| WO | 2006/018604 A1 | 2/2006 | |
| WO | 2006/038157 A2 | 4/2006 | |
| WO | 2006/060900 A1 | 6/2006 | |
| WO | 2006/102355 A2 | 9/2006 | |
| WO | 2006/120629 A2 | 11/2006 | |
| WO | 2007026170 A2 | 3/2007 | |
| WO | 2008/056435 A1 | 5/2008 | |
| WO | 2008110978 A1 | 9/2008 | |
| WO | 2008/120019 A1 | 10/2008 | |
| WO | 2010/011971 A1 | 1/2010 | |
| WO | 2011/083336 A2 | 7/2011 | |

OTHER PUBLICATIONS

Borage et al., Analysis and design of an LCL-T resonant converter as a constant-current power supply, Industrial Electronics, IEEE Transactions on, vol. 52 No. 6 pp. 1547-1554, Dec. 2005.

Flower and Pollock 1997 Series Properties and design of series-paraellel load-resonant converters: their potential in marine and marine-related applications. Transactions on Image Processing, 110(2): 95-118.

Pollock et al (1997) Load resonant converter with zero current swtiching and variable output pwoer Electornic Letters 33(25): 2081-2082.

Pollock (1999) "Constant frequency, constant current load—resonant capacitor charging power supply." IEEE Proceedings Electric Power Applications, 146(2): 187-192.

Pollock and Flower (1996) Series-parallel load-resonant converter for controlled-current arc welding power supply. IEE Proceedings—Electric power applications (143(3) 211-218.

Pollock and Flower (1997) New Method of Power control for Sereis-Parallel Load Resonant Converters Mainining Zero-Current Switching and Unity Power Factor Operation. IEEE Transactions on Power Electronics 12(1) 103-115.

Pollock and Miti (1995) Isolated Step up/down three-phase AC to DC power supply. Electronic letters 31(18) 1527-1529.

Mangesh et al., "LCL-T Resonant Converter With Clamp Diodes: A Novel Constant-Current Power Supply with Inherent Constant-Voltage Limit". IEEE Apr. 2007.

International Search Report for PCT/GB2014/053695 dated Jul. 28, 2015. 10 pages.

(56) References Cited

OTHER PUBLICATIONS

International Preliminary Report on Patentability and Written Opinion; PCT/GB2014/053695; International Filing Date: Dec. 12, 2014; 6 pgs.

* cited by examiner

IMPROVEMENTS RELATING TO POWER ADAPTORS

CROSS-REFERENCE TO RELATED APPLICATIONS

This application claims priority to PCT Application No. PCT/GB2014/053695, having a filing date of Dec. 12, 2014, based off of GB Application No. 1322022.3 having a filing date of Dec. 12, 2013, the entire contents of which are hereby incorporated by reference.

FIELD OF TECHNOLOGY

The following relates to power adaptors, and particularly to power adaptors for providing compatibility between a power reducing device powered from an AC power supply and a load, such as a light source, with a significantly lower power rating than that required to maintain compatibility.

BACKGROUND

LEDs are light sources that are being developed to replace conventional lighting systems, such as fluorescent and incandescent lights, in order to provide more energy efficient systems. Since an incandescent light source typically consumes 60-100 W and has a short lifetime, an LED bulb would be the excellent substitute with considerably less power dissipation and longer life. There has therefore been much research into the development of an LED bulb compatible with TRIAC dimmers, which are common in lighting systems.

A major issue with TRIAC dimmable LED bulbs is dimmer compatibility. The conventional TRIAC dimmer was designed to handle hundreds of watts induced by incandescent bulbs. An LED bulb consuming much less power will interact with those dimmers composed of high-power devices. If the interaction between dimmer and LED bulb is not stabilized, visible flicker is perceptible.

In order to prevent visible flicker, a conventional TRIAC dimmer needs a latching current at firing and a holding current during the TRIAC turn-on after firing. If those two currents are not met, the TRIAC dimmer misfires and the LED light source flickers.

The latching and holding currents are different between different dimmer models. The typical range of latching and holding currents is around 5~50 mA. Those operating requirements do not cause problems when incandescent bulbs are used, due to their high power consumption. However, an LED bulb with much less output power cannot maintain this amount of current over the whole line cycle without additional circuitry.

Conventional power adaptors typically require a second stage that provides compatibility, but this increases costs. It is also known to regulate the LEDs themselves in an attempt to reduce or eliminate flicker, even though the power supply is unstable.

There have now been devised improved power adaptors which overcome or substantially mitigate the above-mentioned and/or other disadvantages associated with the prior art.

SUMMARY

According to a first aspect of the invention, there is provided a power adaptor comprising an input for connection to an AC power supply, an output for connection to a load, and a resonant circuit coupled to the input that provides power to the output suitable for driving the load, wherein the power adaptor includes a controller adapted to drive the resonant circuit in two or more different modes to select different characteristics of the current drawn from the AC power supply, in use.

According to a further aspect of the invention, there is provided a controller for use with a power adaptor comprising an input for connection to an AC power supply, an output for connection to a load, and a resonant circuit coupled to the input that provides power to the output suitable for driving the load, the controller being adapted to drive the resonant circuit in two or more different modes to select different characteristics of the current drawn from the AC power supply, in use.

According to a further aspect of the invention, there is provided a power adaptor comprising an input for connection to an AC power supply, an output for connection to a load, and a resonant circuit coupled to the input that provides power to the output suitable for driving the load, the resonant circuit having two or more resonant frequencies, which are not harmonics of each other, wherein the power adaptor includes a controller adapted to drive the resonant circuit at, or near, each of the two or more resonant frequencies to select different characteristics of the current drawn from the AC power supply, in use.

According to a further aspect of the invention, there is provided a controller for use with a power adaptor comprising an input for connection to an AC power supply, an output for connection to a load, and a resonant circuit coupled to the input that provides power to the output suitable for driving the load, the resonant circuit having two or more resonant frequencies, which are not harmonics of each other, the controller being adapted to drive the resonant circuit at, or near, each of the two or more resonant frequencies to select different characteristics of the current drawn from the AC power supply, in use.

The load may be a light source, for example a solid state light source. The controller may be programmed to drive the resonant circuit at, or near, each of the two or more resonant frequencies to select different characteristics of the current drawn from the AC power supply, in use, eg without user input. The controller may be programmed to drive the resonant circuit according to programmed actions and/or in response to one or more inputs.

The controller may be adapted to drive the resonant circuit at, or near, a plurality of the two or more resonant frequencies within an AC cycle, eg within an AC half-cycle. The controller may be adapted to drive the resonant circuit at, or near, a plurality of the two or more resonant frequencies within each AC cycle, eg within each AC half-cycle, in a selected mode of the controller.

The controller may be adapted to detect a power reducing device of the AC power supply and select a pre-determined current profile for determining the characteristics of the current to be drawn from the AC power supply.

The power adaptor may have a current profile, for example for use with a stable, leading edge, eg TRIAC, dimmer switch, that draws current for the time that the dimmer switch is turned on, or a substantial part thereof.

The power adaptor may have a current profile, for example for use with an unstable, leading edge, eg TRIAC, dimmer switch, that draws current for a pre-determined time period during an intermediate portion of the half-cycle of the AC power supply. In particular, the intermediate portion of the half-cycle of the AC power supply may be separated from the zero crossings, and may be a portion when the voltage is sufficiently high for the TRIAC to be stable. The current drawn may be at a higher level than that drawn in another current profile, eg a current profile for a stable dimmer switch. This may be achieved by utilising a second resonant frequency of the resonant circuit for a pre-determined time period, which causes a greater current to be drawn by the lamp.

The pre-determined time period during which current is drawn may be shorter than the time period during which current is drawn in another current profile, eg a current profile for a stable dimmer switch, in order to maintain the power output to the LED sufficiently low to ensure that the lamp does not overheat. In particular, the current profiles may be adapted such that the power outputs are substantially the same across a half- or full-cycle.

A current profile for use with an unstable, leading edge, eg TRIAC, dimmer switch may be entered when instability is detected. The power adapter may be adapted to monitor the resonant waveform, so as to detect variations in that waveform. Variations in the resonant waveform may have the form of gaps, rapid changes or other variations. The presence or absence of variations in the resonant waveform may be indicative of the type of power reducing device, eg dimmer switch, to which the power adapter is connected. The presence of gaps, variations or rapid changes in the resonant waveform may be indicative of false triggers and the presence of an unstable leading edge (eg TRIAC) dimmer. Any gaps, variations or rapid changes in the resonant waveform can be detected within 1-3 mains half cycles, such that the suitable current profile is activated quickly, with the result that flickering of the lamp is imperceptible by the human eye.

For the leading edge current profiles, the power adaptor may create a load condition when the switch of the power reducing device, eg the TRIAC of the dimmer switch, fires for a pre-determined period, eg for approximately 300 µs, in order to facilitate latching of the TRIAC of the dimmer switch. This load condition may be achieved by overlapping the on-times of the high- and low-side switches of a half-bridge drive for the resonant circuit. The current drawn during this load condition may be greater than the current drawn in the remainder of the cycle, eg at least twice magnitude. The current drawn during the period of the load condition may reduce, eg gradually. For example, the current may initially be at least twice the magnitude of the current drawn in the remainder of the cycle, and this current may reduce to the current drawn in the remainder of the cycle during the time period of the load condition.

The power adaptor may have a current profile, for example for use with a constant mains supply, or a trailing edge dimmer switch, that draws current for the time that the dimmer switch is turned o, or a substantial portion thereof. For trailing edge dimmer switches, it may be necessary to draw a greater current once the dimmer switch turns off, in order to discharge the dimmer switch in a sufficiently short period of time. This may be achieved by utilising a second resonant frequency of the resonant circuit for a pre-determined time period, which causes a greater current to be drawn by the lamp. Alternatively, a load condition may be created, for example by overlapping the on-times of the high- and low-side switches of a half-bridge drive for the resonant circuit.

The power adaptor may have a current profile, for example for use with an unstable, leading edge, eg TRIAC, dimmer switch that stops drawing current following an initial time period following firing of the TRIAC of a dimmer switch, eg once current inrush has collapsed, thereby turning off the TRIAC of the dimmer. The initial period may be a pre-determined time period, eg 300 µs.

The inrush current may charge an energy storage device, eg one or more capacitors, which provide power to the output once the TRIAC of the dimmer has been turned off.

The provision of power to the output may continue until the TRIAC of the dimmer turns back on, which may be detected by detecting a change, eg a sharp rise, in the input voltage. The power adaptor may cease providing power to the output during the time period in which the TRIAC of the dimmer is turned on.

This allows TRIAC dimmers that have very high latch and hold current requirements (eg 1000 W) to dim very low power LEDs (eg 5 W) without visible flicker. In particular, this allows the use of a single stage power adaptor, eg a resonant power adaptor, which is less expensive than power adaptors having a second stage to regulate out flicker.

This current profile is considered to be novel and inventive in itself and, hence, according to a further aspect of the invention, there is provided a power adaptor comprising an input for connection to an AC power supply including a power reducing device, an output for connection to a load, an energy storage device coupled to the input, and a resonant circuit coupled to the input that provides power to the output suitable for driving the load, wherein the power adaptor includes a controller adapted to detect activation of a switch in the power reducing device of the AC power supply and reduce the current drawn from the AC power supply to deactivate said switch, the energy storage device providing power to the output in a period during which the switch of the power reducing device is deactivated.

The load may be a light source, for example a solid state light source.

The resonant circuit may have a resonant frequency at which it is able to maintain a substantially constant current input for varying input voltages. The resonant circuit may therefore be an LCL series-parallel resonant circuit. An LCL series-parallel resonant circuit comprises a first inductor L1 and a first capacitor C1 in series, and a parallel load leg including a second inductor L2. The first inductor L1 and first capacitor C1 are connected in series between two input terminals of the resonant circuit, and the load leg is connected in parallel across the first capacitor C1, wherein the load leg comprises the second inductor L2 and an output for driving the load, which are connected in series.

Power adaptors utilising an LCL series-parallel resonant circuit are described in WO 2008/120019, WO 2010/041067, WO 2010/139992, WO 2011/083336 and WO 2012/010900, the teaching of each of which are incorporated herein by reference in their entirety.

The use of an LCL series-parallel resonant circuit provides a power adaptor suitable for solid state light sources, such as LEDs, that has a substantially constant current draw and high efficiency. In particular, the output current becomes independent of output voltage and if the power adaptor is powered by a low frequency sine voltage input, and the output voltage is constant, ie an LED load, the input current becomes a low frequency, substantially square wave ideal for drive by a TRIAC dimmer as it maintains the hold current at the lowest possible power whilst providing the LED with a current source that varies in brightness with the low frequency input voltage, ie it makes the LED act like a lamp bulb and enables control by a TRIAC dimmer at vastly reduced power and high power factor relative to other power adaptor technology.

The load may therefore be one or more LEDs, and the input may be drawn from a TRIAC or SCR dimmer.

The LCL series-parallel circuit may be adapted to have at least two resonant frequencies, a first resonant frequency that provides, at a given input voltage, a constant current output that is independent of the load, and a second resonant frequency that provides, at a given input voltage, a current that varies with load. An LCL series-parallel circuit will also have a third resonant frequency at 0 Hz, ie DC current.

These resonant frequencies may be achieved by selecting the first inductor, the second inductor and the first capacitor, such that the reactances of those components are substantially equal. The second resonant frequency may be adapted to provide a significantly greater power at the output, relative to the first resonant frequency. A controller of the power adaptor may therefore be adapted to switch between the different resonant frequencies in order to utilise their different characteristics.

The resonant circuit may be driven by a resonance drive circuit, which provides a resonance drive signal to the resonant circuit. The resonance drive signal is preferably an alternating signal, and is preferably provided by an oscillator that may control two or four electronic switches, eg FETs. The resonance drive signal typically has the form of a square wave. The purpose of the drive circuit is to excite the resonant circuit with an alternating voltage, the alternating voltage typically consisting of blocks of positive and negative voltage. The electronic switches are typically connected together in the form of a full bridge inverter (4 switches) or a half bridge inverter (2 switches).

The power adaptor may be adapted to modify the waveform of the current that would inherently be drawn by the resonant circuit, and in particular modify the shape and/or size of that waveform. In particular, a resonance drive signal may be provided to the resonant circuit, wherein the resonance drive signal is adapted to determine the desired input current waveform. For instance, the power adaptor may comprise at least one half-bridge drive circuit for providing a drive signal to the resonant circuit, and a switch controller for the half-bridge drive circuit, the half-bridge drive circuit having a high-side switch and a low-side switch. The switch controller may be adapted to provide one or more of the following, in at least one mode: (i) to provide the high-side switch and the low-side switch with on-times of different durations, (ii) to provide the high-side switch and the low-side switch with on-times that overlap, and (iii) to provide the high-side switch and the low-side switch with on-times that are synchronous.

The high-side switch and the low-side switch having on-times of different durations may be utilised to control the current drawn from the input. In particular, the high-side switch and the low-side switch may have on-times of different durations, ie asymmetric on-times, such that the degree of asymmetry between the high-side switch and the low-side switch determines the current drawn from the input. It has been found that the greater the degree of asymmetry between the on-times of the high-side switch and the low-side switch, the less current drawn from the input.

The current drawn at the input may be substantially equal to the current provided at the output, for example if there is no overlap between the on-times of the high- and low-side switches. This enables dimming control effected by the switch controller, without the need to change the frequency at which the resonant circuit is driven, and therefore without any need to change the resonant circuit itself. In particular, in order to reduce the current drawn from the input and the current provided at the output, the on-times of the high-side switch and the low-side switch may be varied relative to each other, for example such that the on-time of the high-side switch is shorter than the on-time of the low-side switch.

The high-side switch and the low-side switch having on-times of different durations, ie asymmetric on-times, may be utilised to determine the waveform of the current drawn at the input, eg to provide dimmer compatibility and/or reduce harmonic distortion. In particular, this may be achieved by the switch controller providing the high-side switch and the low-side switch with on-times of different durations, ie asymmetric on-times, and varying the degree of asymmetry between the high-side switch and the low-side switch during each input cycle to determine the waveform of the current drawn from the input.

An overlap between the on-times of the switches may be utilised to create a load condition in the period of overlap, in each input cycle, which may increase the current drawn at the input relative to the current delivered to the output in the period of overlap, in each input cycle. This enables the current at the output to be reduced without reducing the current drawn at the input, for example. In addition, it enables a latch current for a dimmer switch to be drawn in each input cycle, in the period of overlap, and a lower hold current to be drawn subsequently, in each input cycle, without any need to change the frequency at which the resonant circuit is driven. Since the latch current for a conventional dimmer switch in a mains supply (eg 85 mA) typically only needs to be drawn for a few hundred μs, relative to the hold current (eg 50 mA) that is typically drawn for a few ms, the additional current (35 mA) that is not provided to the output would result in acceptably small losses, eg 100-200 mW on 230V mains supply. This control may also help reduce the voltage reduction problems seen just after the TRIAC of a conventional dimmer switch fires, and may therefore negate the need for snubber circuits and their associated losses.

The power adaptor may also have a mode in which no power is provided at the output, but the power adaptor provides a load condition to the input, by the switch controller providing the high-side switch and the low-side switch with simultaneous on-times.

The greater the duration of the overlap for the on-times or the duration of the simultaneous on-times, the lower the resistance or dynamic impedance of the load provided. This is particularly advantageous for solid state light sources, eg LEDs. In particular, this load condition may provide a DC path, which prevents false start-up conditions. This enables use with dimmers, and also prevents glowing occurring from a pickup supply.

The switch controller may utilise any combination of the above configurations of on-times to provide the desired current draw at the input and the required current at the output.

Where the power adaptor has a mode in which a load condition is generated by overlapping or synchronous on-times of the switches, the controller may be adapted to determine whether the impedance of the load condition will be acceptable for the voltage of the power supply. The controller is preferably, therefore, adapted to monitor the voltage of the power supply.

The power adaptor may be adapted to switch between two or more modes, which each provide a different configuration of on-times for the high-side switch and the low-side switch. Since the embodiments of the present invention enables different modes without changing the frequency at which the resonant circuit is driven, the resonant circuit is preferably driven at, or approximately at, its resonant frequency or a sub-harmonic thereof in each mode.

The power adaptor may be adapted to monitor the input voltage, and alter the ratio between the current provided at the output and the resistance across the input, based on that input voltage. In particular, this ratio may be altered proportionally based on the input voltage, such that sudden changes in current and/or input resistance are not created when switching modes. Where the power adaptor is adapted for use with a mains supply and solid state light sources, these sudden changes in current and/or input resistance may cause ringing or harmonics on the mains, possible flicker on the output, and may result in dimmer incompatibility. The ratio may be altered by changing the amount of overlap of the on-times of the high- and low-side switches.

The high- and low-side switches are preferably bipolar junction transistors (BJTs), which are typically less expensive than field-effect transistors (FETs). Furthermore, since BJTs have limited gain, there is a reduced risk of damage to the switches from current inrush relative to FETs, which have infinite gain and require damping circuits.

In presently preferred embodiments, the high-side switch and the low side switch of the half-bridge drive circuit are arranged with their respective emitter or source terminals connected at the centre of the half bridge.

Since, in this embodiment, the switching voltage applied to the base or gate terminal of a transistor is referenced relative to the voltage at the emitter or source terminal, this enables a common reference in the form of a floating ground. This removes any need for a level shifter circuit, which is a high voltage circuit that is typically expensive and results in power loss, and hence reduced efficiency. Embodiments of the invention therefore reduces cost and increases efficiency relative to the prior art. In addition, embodiments of the invention enables the drive circuitry to be at low voltage, and enables the same drive circuitry to drive both the high- and low-side switches.

The high-side switch is preferably an NPN bipolar junction transistor (BJT), or a similarly functioning transistor. The low-side switch is preferably a PNP bipolar junction transistor (BJT), or a similarly functioning transistor. The transistors being bipolar junction transistors (BJTs) may enable the switch controller to be at low voltage, eg less than 5V, eg 2V. Where an integrated circuit is provided, a low voltage power supply may be formed by one or more diodes and an energy storage device such as a capacitor.

The switches are typically configured with a switching voltage at the base or gate terminal that is determined relative to the voltage at the emitter or source terminal. The connection between the emitter or source terminals of the high-side switch and the low side switch preferably therefore provides a common reference for the switching voltage of the high-side switch and the low-side switch in the form of a floating ground. The collector or drain terminals of the high-side switch and the low side switch may be connected to the positive supply voltage and normal ground, eg 0V, respectively, of the circuit.

The low-side switch preferably has a negative switching voltage at the base/gate of the switch that is determined relative to a common reference in the form of a floating ground. The negative switching voltage may be generated by a charge-pump, for example.

The switch controller preferably takes the form of an integrated circuit. The ground connection of the switch controller is preferably connected to the emitter or source terminals of the high-side switch and the low side switch, such that the ground connection of the switch controller has a reference common to the high-side switch and the low side switch in the form of a floating ground.

The switch controller is preferably provided with a local supply, or a bootstrap from the normal ground, or the capacitors that would typically be connected across the high- and low-side switches may be adapted to provide power to the switch controller, these may feed the charge pump diodes on the microprocessor.

This embodiment of the invention is particularly advantageous when used to drive an LCL series-parallel resonant circuit. This arrangement enables the half-bridge drive circuit to function without any feedback, eg from an inductor to an oscillator drive. This arrangement also removes the need for any feedback transformers, which are large and expensive. Embodiments of the present invention are also particularly advantageous to the LCL circuit as it allows the use of a low voltage process.

According to a further aspect of the invention, there is provided a lighting unit suitable for direct connection to a mains supply, the lighting unit comprising a power adaptor as described above and one or more non-solid state light sources.

The dimmer circuit preferably includes one or more silicon-controlled rectifiers (SCRs), or a TRIAC.

BRIEF DESCRIPTION OF THE DRAWINGS

Some of the embodiments will be described in detail, with reference to the following figures, wherein like designations denote like members, wherein.

DETAILED DESCRIPTION

Figure 1:
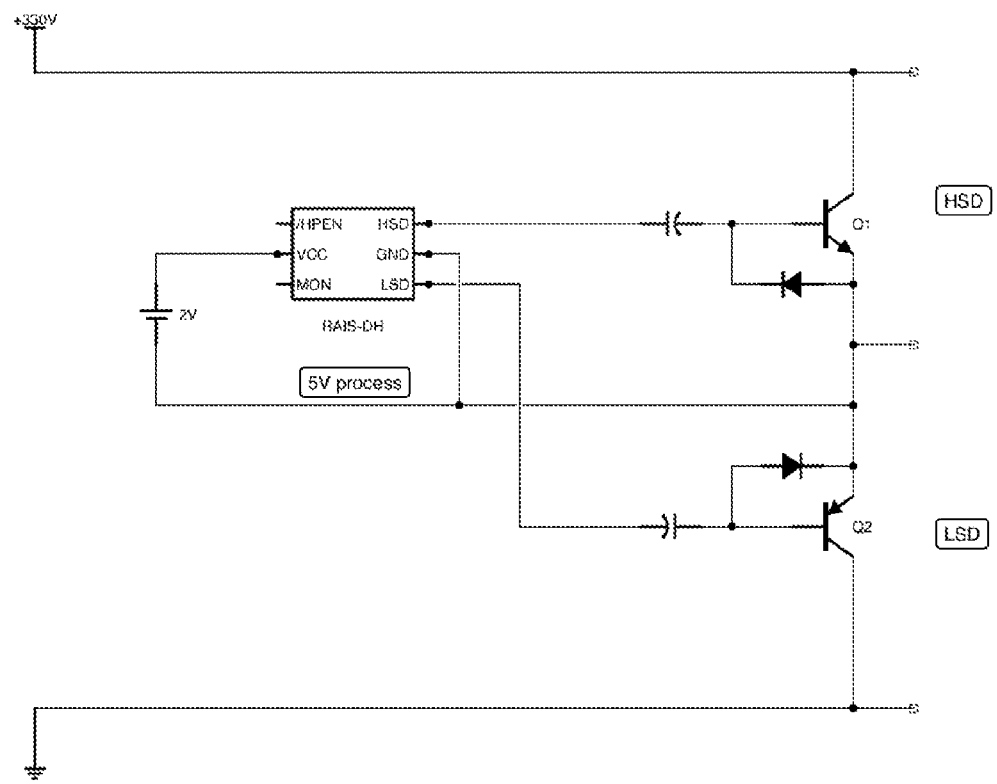
FIG. 1 shows a switch controller and a half-bridge drive circuit of an embodiment of the power adaptor according to the invention.
Figure 2:
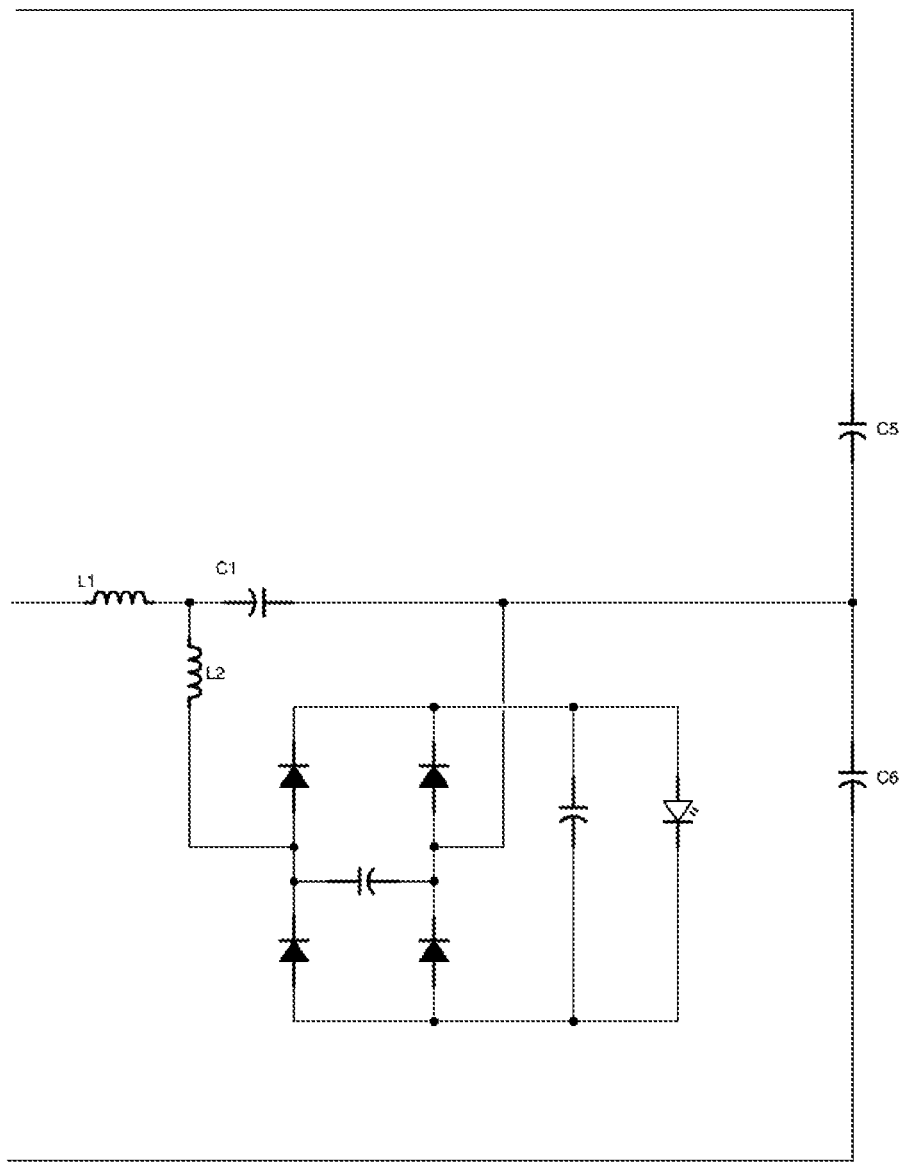
FIG. 2 shows an LCL series-parallel resonant circuit and DC link capacitors of an embodiment of the power adaptor according to the invention.

An embodiment of a power adaptor according to the invention comprises an input rectifier stage (not shown in the Figures), a switch controller (RAIS-DH) and a half bridge drive circuit (HSD,LSD) (shown in FIG. 1), and an LCL series-parallel resonant circuit (L1,C1,L2) and an output rectifier stage (shown in FIG. 2). The high-side switch, Q1, is an NPN BJT transistor, and the low-side switch, Q2, is PNP BJT transistor. Q1 and Q2 are arranged with their emitters/sources connected to a common point, which forms a floating ground for both Q1 and Q2. This common point also provides the output of the half-bridge drive circuit which, in this embodiment, is fed to an LCL series-parallel resonant circuit suitable for driving a solid state light source (of the form described in detail in GB 2449616 B8 and WO 2010/041067 A1).

Q1 and Q2 are each switched by providing a switching pulse to the respective base/gate, the voltage of the switching pulse being referenced to the emitter/source of the switch. When Q1 is switched on, the floating ground will be at the positive supply voltage, eg 330V, and the voltage at the base/gate of Q1 will be positive type relative to the floating ground and hence the emitter/source voltage. When Q2 is switched on, the floating ground will be at normal ground, eg 0V, and the voltage at the base/gate of Q1 will be negative relative to the floating ground and hence the emitter/source voltage.

The switches Q1 and Q2 are driven by a switch controller, which is an integrated circuit designated RAIS-DH, that is also referenced to the floating ground. Since the switch controller RAIS-DH is driving BJT transistors, which require +−0.7V, the switch controller can be powered at 2V. In order to switch on Q1, the switch controller provides a positive pulse to the base/gate of Q1, relative to the floating ground (at the positive supply voltage, eg 330V) and hence the emitter/source voltage. In order to switch on Q2, the switch controller provides a negative pulse to the base/gate of Q2, relative to the floating ground (at normal ground, eg 0V) and hence the emitter/source voltage.

Q1 forms the high-side drive (HSD) and Q2 forms the low-side drive (LSD) for an LCL series-parallel resonant circuit (shown in FIG. 2), which provides an output suitable for driving a solid state light source. The switch controller is configured to manipulate the current drawn at the input, the current delivered to the output, and/or the impedance of the power adaptor, by controlling the on-times of the high-side drive (HSD) and the low-side drive (LSD).

The output of the resonant circuit is rectified using a diode bridge, and then smoothed by a capacitor at the output of the rectifier, so as to form an output suitable for driving the LED. The capacitors C5 and C6 create a connection point for the second end of the resonant circuit, substantially midway in voltage between DC+ and 0V.

The LCL series-parallel resonant circuit is configured such that it has two non-zero resonant frequencies.

FIGS. 3-6 illustrate the voltages and currents associated with first, second, third and fourth modes of the power adaptor according to embodiments of the invention, across a half-cycle. In particular, a first trace (1) illustrates the voltage of the mains supply as seen before the dimmer switch, which is generally sinusoidal in form. A second trace (2) illustrates the voltage output from the dimmer switch, which is the input voltage of the lamp. A third trace (3) is the current drawn from the mains supply by the lamp.

Figure 3:
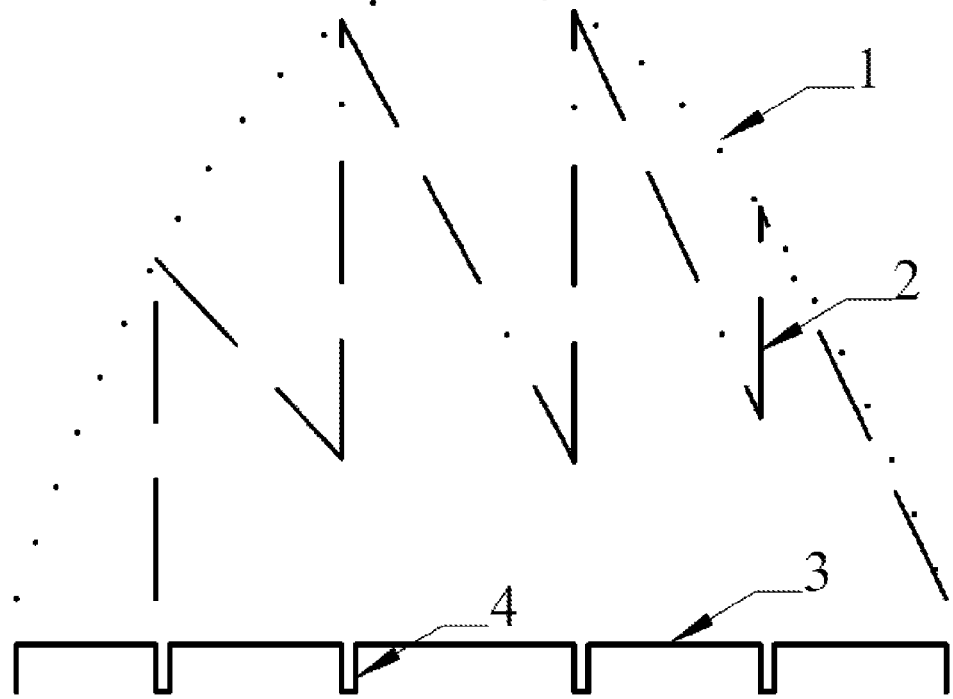
FIG. 3 illustrates the voltages and currents associated with a first mode of the power adaptor according to an embodiment of the invention, across a half-cycle.

In FIG. 3, a first mode is illustrated for use with an unstable, leading edge, eg TRIAC, dimmer switch.

In this mode, the controller stops the power adaptor drawing current following a pre-determined time period of 300 μs following firing of the TRIAC of the dimmer switch, ie once the current inrush has collapsed, thereby turning off the TRIAC of the dimmer. The inrush current drawn by the power adaptor in this period charges the DC link capacitors. Following a pre-determined period of time during which no power is delivered to the lamp (indicated by reference numeral 4 in FIG. 3), which is sufficient to allow the TRIAC to turn off, the power adaptor provides power from the DC link capacitors to the output and the lamp. In particular, the lamp draws a constant current once the TRIAC has turned off. The provision of power to the output continues until the TRIAC of the dimmer switch turns back on, which is detected by detecting a sharp rise in the input voltage.

This allows TRIAC dimmers that have very high latch and hold current requirements (eg 1000 W) to dim very low power LEDs (eg 5 W) without visible flicker. In particular, this allows the use of a single stage power adaptor, eg a resonant power adaptor, which is less expensive than power adaptors having a second stage to regulate out flicker.

Figure 4:
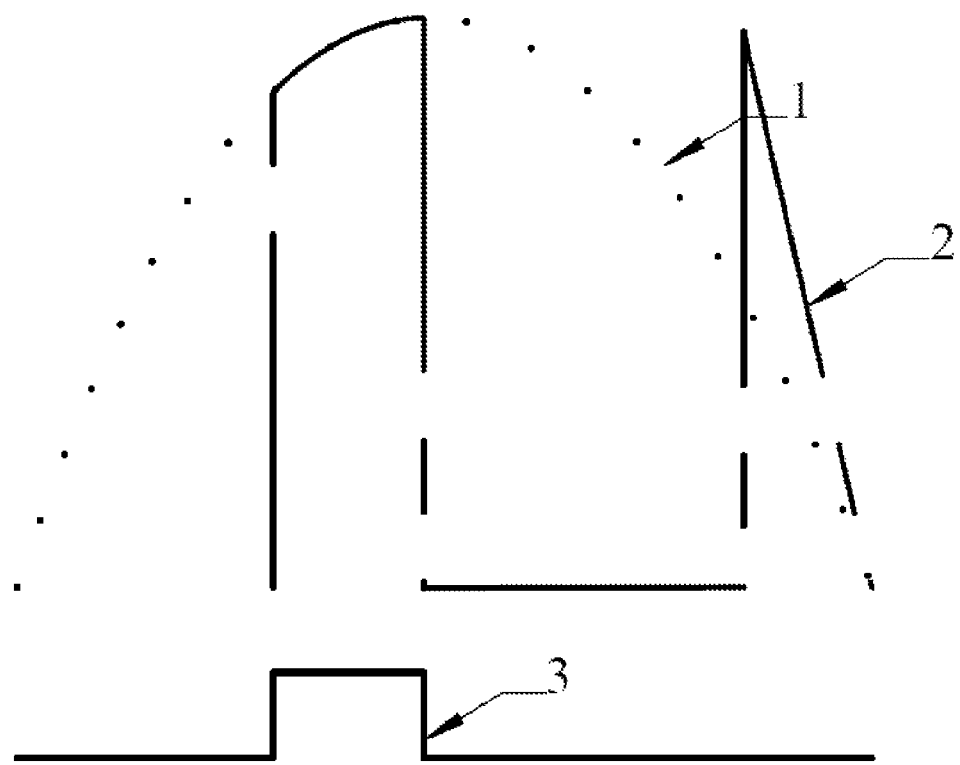
FIG. 4 illustrates the voltages and currents associated with a second mode of the power adaptor according to an embodiment of the invention, across a half-cycle.

In FIG. 4, a second mode is illustrated for use with an unstable, leading edge, eg TRIAC, dimmer switch.

In this mode, the power adaptor and lamp draw current for a pre-determined time period during the half-cycle, when the voltage is sufficiently high for the TRIAC to be stable. The current drawn may be at a higher level than that drawn for a stable dimmer switch. This may be achieved by utilising a second resonant frequency of the resonant circuit for a pre-determined time period, which causes a greater current to be drawn by the lamp.

The pre-determined time period during which current is drawn is shorter than the time period during which current is drawn in the stable mode, in order to maintain the power output to the LED at the same level as that in the other modes, thereby ensuring that the lamp does not overheat.

This mode is entered when instability is detected. The power adapter is adapted to monitor the resonant waveform, so as to detect variations in that waveform that indicate instability. Variations in the resonant waveform may have the form of gaps, rapid changes or other variations, which are indicative of false triggers and the presence of an unstable leading edge (eg TRIAC) dimmer. This feature may enable a circuit that directly monitors the input voltage to be omitted. In addition, any gaps, variations or rapid changes in the resonant waveform can be detected within 1-3 mains half cycles, such that the suitable mode of operation is activated quickly, with the result that flickering of the lamp is imperceptible by the human eye.

In addition, although not shown in FIG. 4, the power adaptor also creates a load condition for a pre-determined period, eg for approximately 300 μs, when the TRIAC fires, in order to facilitate latching of the TRIAC of the dimmer switch. This load condition is achieved by overlapping the on-times of the high- and low-side switches (HSD,LSD) of the half-bridge drive for the resonant circuit. The current drawn during this load condition is initially 2-3 times the magnitude of the current drawn in the remainder of the cycle, and this current reduces gradually during the period of the load condition to the current drawn in the remainder of the cycle.

Figure 5:
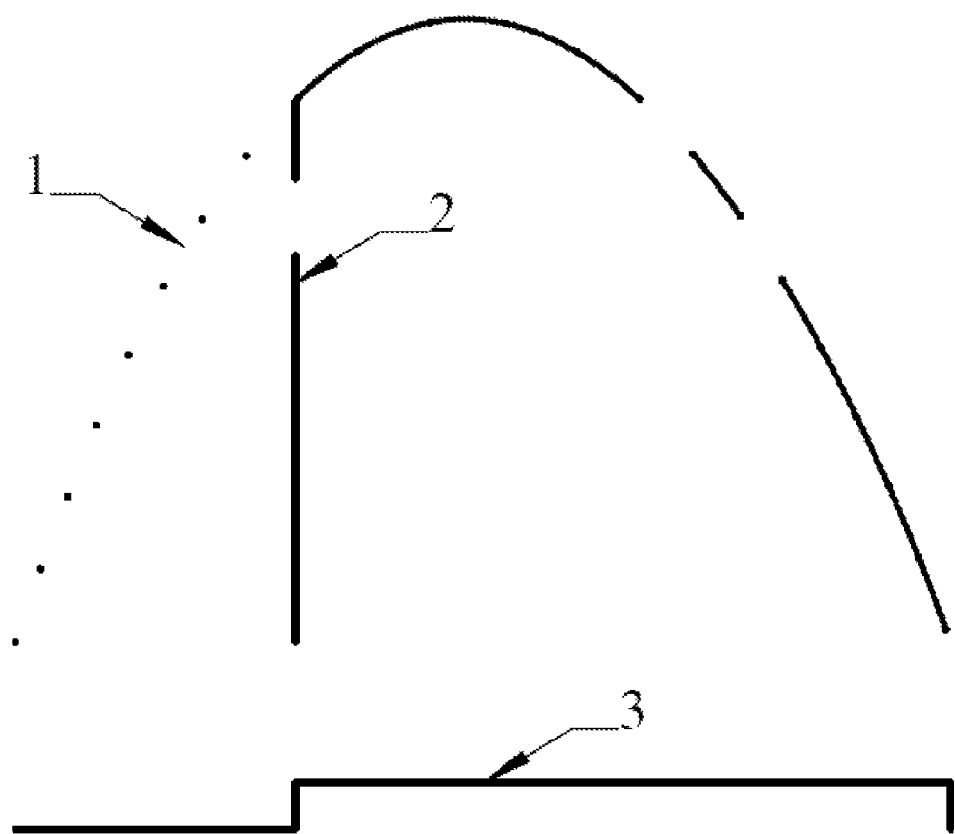
FIG. 5 illustrates the voltages and currents associated with a third mode of the power adaptor according to an embodiment of the invention, across a half-cycle.

In FIG. 5, a third mode is illustrated for use with a stable, leading edge, eg TRIAC, dimmer switch.

In this mode, the power adaptor enables the lamp to draw current for the entire time period during which the dimmer switch is turned on.

In addition, although not shown in FIG. 4, the power adaptor also creates a load condition for a pre-determined period, eg for approximately 300 μs, when the TRIAC fires, in order to facilitate latching of the TRIAC of the dimmer switch. This load condition is achieved by overlapping the on-times of the high- and low-side switches (HSD,LSD) of the half-bridge drive for the resonant circuit. The current drawn during this load condition is initially 2-3 times the magnitude of the current drawn in the remainder of the cycle, and this current reduces gradually during the period of the load condition to the current drawn in the remainder of the cycle.

Figure 6:
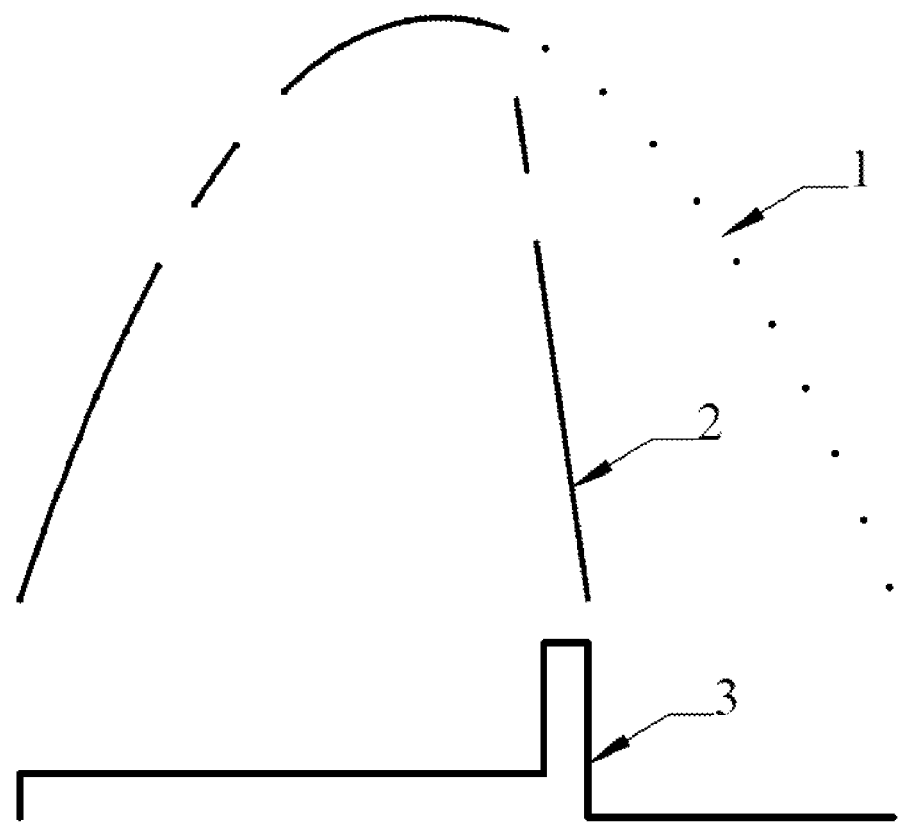
FIG. 6 illustrates the voltages and currents associated with a fourth mode of the power adaptor according to an embodiment of the invention, across a half-cycle.

In FIG. 6, a fourth mode is illustrated for use with a trailing edge dimmer switch.

In this mode, the power adaptor enables the lamp to draw current for the entire time period during which the dimmer switch is turned on.

In addition, the power adaptor draws a greater current once the dimmer switch turns off, in order to discharge the dimmer switch in a sufficiently short period of time. This is achieved by utilising a second resonant frequency of the resonant circuit for a pre-determined time period, which causes a greater current to be drawn by the lamp. However, it may also be achieved by creating a load condition, for example by overlapping the on-times of the high- and low-side switches (HSD,LSD) of the half-bridge drive for the resonant circuit.

The claims are as follows:

1. A power adaptor comprising:
   an input for connection to an AC power supply;
   an output for connection to a load; and
   a resonant circuit coupled to the input that provides power to the output suitable for driving the load;
   wherein the power adaptor includes a controller adapted to drive the resonant circuit in two or more different modes to select different characteristics of a current drawn from the AC power supply, in use;
   wherein the controller is adapted to detect a power reducing of the AC power supply and select a pre-determined current profile for determining the characteristics of the current to be drawn from the AC power supply.

2. The power adaptor as claimed in claim 1, wherein the two or more resonant frequencies of the resonant circuit are achieved without changing the components of the resonant circuit.

3. The power adaptor as claimed in claim 1, wherein the components of the resonant circuit are selected to provide two or more resonant frequencies, which are utilised by the controller selectively driving the resonant circuit at, or near, one of those resonant frequencies.

4. The power adaptor as claimed in claim 1, wherein the controller is adapted to drive the resonant circuit at, or near, a plurality of the two or more resonant frequencies within an AC cycle.

5. The power adaptor as claimed in claim 1, wherein the power adaptor has a current profile that draws current for the time that a dimmer switch is turned on, or a substantial part thereof.

6. The power adaptor as claimed in claim 1, wherein the power adaptor has a current profile that draws current for a pre-determined time period during an intermediate portion of the half-cycle of the AC power supply.

7. The power adaptor as claimed in claim 6, wherein the intermediate portion of the half-cycle of the AC power supply is separated from the zero crossings, and is a portion when the voltage is sufficiently high for a switch of the power reducing device to be stable.

8. A power adaptor as claimed in claim 1, wherein the power adaptor has a current profile for use with an unstable, leading edge, the current profile being for a dimmer switch that is entered when instability is detected.

9. The power adaptor as claimed in claim 1, wherein the power adapter is adapted to monitor a resonant waveform, so as to detect variations in the resonant waveform.

10. The power adaptor as claimed in claim 1, wherein for the current profile(s) for leading edge dimmer switches, the power adaptor creates a load condition when the switch of the power reducing device fires for a pre-determined period in order to facilitate latching of the leading edge dimmer switches.

11. The power adaptor as claimed in claim 1, wherein the power adaptor has a current profile that draws current for a time that a switch of a power reducing device is turned on, or a substantial portion thereof.

12. A power adaptor as claimed in claim 1, wherein the power adaptor has a current profile that stops drawing current following an initial time period following firing of a switch of a power reducing device.

13. The power adaptor as claimed in claim 1, wherein the load is a solid state light source.

14. The power adaptor as claimed in claim 1, wherein the resonant circuit has a resonant frequency at which the resonant circuit is able to maintain a substantially constant current input for varying input voltages.

15. The power adaptor as claimed in claim 1, wherein the resonant circuit is an LCL series-parallel resonant circuit.

16. The power adaptor as claimed in claim 1, wherein the resonant circuit has two or more resonant frequencies, which are not harmonics of each other, and the controller is adapted to drive the resonant circuit at, or near, each of the two or more resonant frequencies to select different characteristics of the current drawn from the AC power supply, in use.

17. A power adaptor as claimed in claim 1, wherein the power adaptor comprises at least one half-bridge drive circuit for providing a drive signal to the resonant circuit, and a switch controller for the half-bridge drive circuit, the half-bridge drive circuit having a high-side switch and a low-side switch, and each of the two or more different modes providing a different configuration of on-times for the high-side switch and the low-side switch.

18. A power adaptor as claimed in claim 1, wherein the controller is adapted to monitor the voltage of the power supply.

19. A power adaptor as claimed in claim 1, wherein the power adaptor is adapted to monitor the input voltage, and alter the ratio between the current provided at the output and the resistance across the input, based on that input voltage.

20. A power adaptor as claimed in claim 19, wherein the ratio between the current provided at the output and the resistance across the input is altered proportionally based on the input voltage, such that sudden changes in current and/or input resistance are not created when switching modes.

21. A power adaptor as claimed in claim 1, wherein the power adaptor comprises at least one half-bridge drive circuit for providing a drive signal to the resonant circuit, and a switch controller for the half-bridge drive circuit, the half-bridge drive circuit having a high-side switch and a low-side switch, and the high-side switch and the low side switch of the half-bridge drive circuit being arranged with their respective emitter or source terminals connected at the centre of the half bridge.

22. A power adaptor as claimed in claim 21, wherein the connection between the emitter or source terminals of the high-side switch and the low side switch provides a common reference for the switching voltage of the high-side switch and the low-side switch in the form of a floating ground.

23. A power adaptor comprising:
    an input for connection to an AC power supply including a power reducing device;
    an output for connection to a load;
    an energy storage device coupled to the input; and
    a resonant circuit coupled to the input that provides power to the output suitable for driving the load;
    wherein the power adaptor includes a controller adapted to detect activation of a switch in the power reducing device of the AC power supply and reduce a current drawn from the AC power supply to deactivate the switch, the energy storage device providing power to the output in a period during which the switch of the power reducing device is deactivated.

24. A power adaptor comprising:
an input for connection to an AC power supply;
an output for connection to a load; and
a resonant circuit coupled to the input that provides power to the output suitable for driving the load, the resonant circuit having two or more resonant frequencies, which are not harmonics of each other;
wherein the power adaptor includes a controller adapted to drive the resonant circuit at, or near, each of the two or more resonant frequencies to select different characteristics of the current drawn from the AC power supply, in use.

* * * * *